US012277446B2

(12) United States Patent
White et al.

(10) Patent No.: US 12,277,446 B2
(45) Date of Patent: Apr. 15, 2025

(54) RUNTIME CONTAINER PROTECTION

(71) Applicant: Cisco Technology, Inc., San Jose, CA (US)

(72) Inventors: John David White, Knoxville, TN (US); Steven Joseph Rich, Maryville, TN (US); William Michael Hudson, Jr., Hampstead, NC (US); Chris Allen Shenefiel, Williamsburg, VA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 968 days.

(21) Appl. No.: 17/202,447

(22) Filed: Mar. 16, 2021

(65) Prior Publication Data
US 2022/0300330 A1    Sep. 22, 2022

(51) Int. Cl.
*G06F 9/50* (2006.01)
*G06F 12/02* (2006.01)
*G06F 12/14* (2006.01)
*G06F 21/57* (2013.01)
*G06F 21/62* (2013.01)
*G06F 21/78* (2013.01)

(52) U.S. Cl.
CPC ........ *G06F 9/5016* (2013.01); *G06F 12/0292* (2013.01); *G06F 12/145* (2013.01); *G06F 21/577* (2013.01); *G06F 21/6272* (2013.01); *G06F 21/78* (2013.01)

(58) Field of Classification Search
None
See application file for complete search history.

(56) References Cited

U.S. PATENT DOCUMENTS 7,281,102 B1 * 10/2007 Agesen ............... G06F 12/1458
 711/158
8,607,013 B2 * 12/2013 Chen ..................... G06F 9/461
 711/6

(Continued)

OTHER PUBLICATIONS

Sarkale et al. "Secure Cloud Container: Runtime Behavior Monitoring using Most Privileged Container (MPC)", 2017 IEEE, pp. 351-356.*

(Continued)

*Primary Examiner* — Van H Nguyen
(74) *Attorney, Agent, or Firm* — Baker Botts L.L.P.

(57) ABSTRACT

According to certain embodiments, a method comprises monitoring a request for use of memory requested by a container manager application on behalf of a given one of a plurality of containers during runtime of the given container. The method further comprises determining that the request for use of memory has caused an exception. The exception indicates that the request has requested an invalid operation on a memory table or that the request has requested a previously not seen memory table. In response, the method further comprises determining an action to perform. The action depends on both first trustworthiness information associated with the given container and second trustworthiness information associated with the given container. The first trustworthiness information is obtained from a Third Party Reputation Service (TPRS). The second trustworthiness information is obtained based on monitoring the runtime behavior of the given container.

16 Claims, 3 Drawing Sheets

(56) References Cited

U.S. PATENT DOCUMENTS

| | | | |
|---|---|---|---|
| 8,850,588 B2* | 9/2014 | Kumar | H04L 63/1425 |
| | | | 726/25 |
| 8,984,478 B2 | 3/2015 | Epstein | |
| 10,163,112 B2* | 12/2018 | Ekambaram | G06F 9/45504 |
| 10,503,623 B2* | 12/2019 | Keller | G06F 9/45558 |
| 10,586,042 B2* | 3/2020 | Stopel | G06F 21/554 |
| 10,599,833 B2* | 3/2020 | Levin | G06F 21/566 |
| 10,885,189 B2* | 1/2021 | Jeffries | G06F 21/577 |
| 11,580,230 B2* | 2/2023 | Bhatt | G06F 21/52 |
| 2013/0086299 A1 | 4/2013 | Epstein | |
| 2017/0098072 A1 | 4/2017 | Stopel et al. | |
| 2017/0315795 A1 | 11/2017 | Keller | |
| 2018/0336351 A1* | 11/2018 | Jeffries | G06F 21/53 |
| 2019/0005246 A1 | 1/2019 | Cherny et al. | |
| 2019/0147160 A1 | 5/2019 | Hepkin et al. | |
| 2019/0332777 A1 | 10/2019 | Edwards et al. | |

OTHER PUBLICATIONS

Sultan et al. "Container Security: Issues, Challenges, and the Road Ahead", 2019 IEEE, pp. 52976-52996.*

* cited by examiner

RUNTIME CONTAINER PROTECTION

TECHNICAL FIELD

The present disclosure generally relates to computer program security, and more specifically to runtime container protection.

BACKGROUND

Containers provide an efficient approach to creating virtual environments for applications by providing virtualization at the operating system level, rather than at the hardware level. For example, virtualization at the hardware level inserts a hypervisor shim between the operating system and the physical hardware so that each machine loads its own operating system, drivers, and applications. Containers virtually slice the host's operating system into segments that appear as dedicated machines to each container application.

DESCRIPTION OF EXAMPLE EMBODIMENTS

Overview

Figure 1:
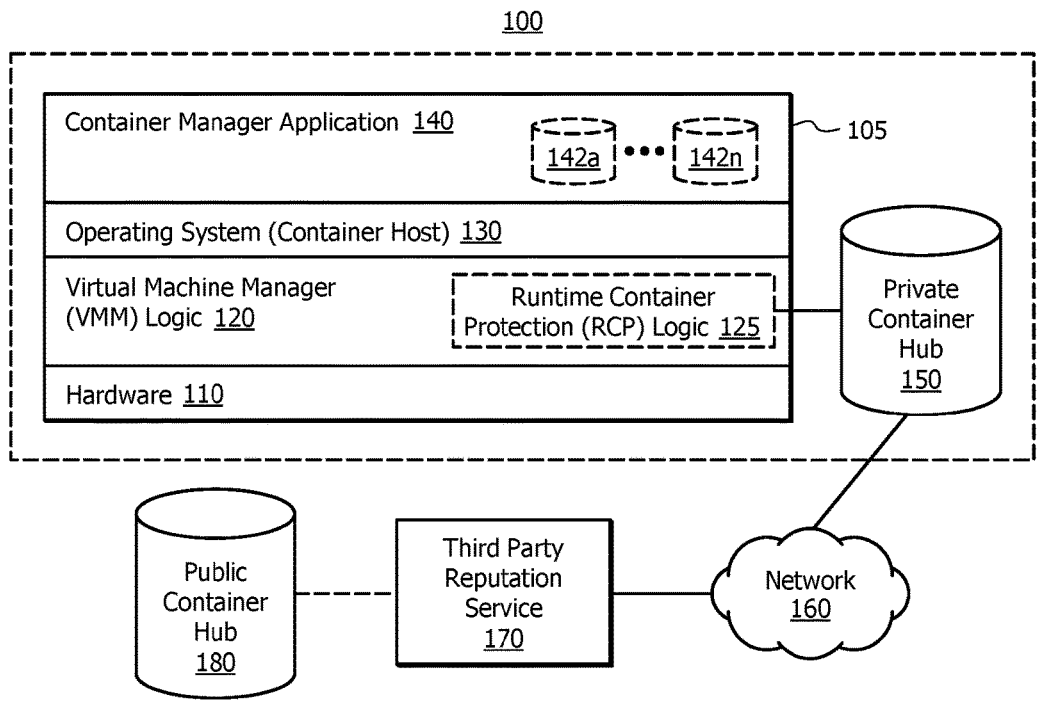
FIGS. 1 illustrates an example of a system comprising virtual containers, in accordance with certain embodiments.

According to an embodiment, a system comprises one or more processors and one or more computer-readable non-transitory storage media comprising instructions that, when executed by the one or more processors, cause one or more components of the system to perform operations. The operations comprise monitoring a request for use of memory, determining that the request for use of memory has caused an exception and, in response, determining an action to perform. The request for use of memory is requested by a container manager application on behalf of a given container during runtime of the given container. The given container corresponds to one of a plurality of containers managed by the container manager application. The exception indicates that the request for use of memory requests an invalid operation on a memory table or that the request for use of memory requests a previously not seen memory table. Determining the action to perform depends on both first trustworthiness information associated with the given container and second trustworthiness information associated with the given container. The first trustworthiness information is obtained from a Third Party Reputation Service (TPRS). The second trustworthiness information is obtained based on monitoring the runtime behavior of the given container.

According to another embodiment, a method comprises monitoring a request for use of memory, determining that the request for use of memory has caused an exception and, in response, determining an action to perform. The request for use of memory is requested by a container manager application on behalf of a given container during runtime of the given container. The given container corresponds to one of a plurality of containers managed by the container manager application. The exception indicates that the request for use of memory requests an invalid operation on a memory table or that the request for use of memory requests a previously not seen memory table. Determining the action to perform depends on both first trustworthiness information associated with the given container and second trustworthiness information associated with the given container. The first trustworthiness information is obtained from a Third Party Reputation Service (TPRS). The second trustworthiness information is obtained based on monitoring the runtime behavior of the given container.

According to yet another embodiment, one or more computer-readable non-transitory storage media may embody instructions that, when executed by a processor, cause the performance of operations including monitoring a request for use of memory, determining that the request for use of memory has caused an exception and, in response, determining an action to perform. The request for use of memory is requested by a container manager application on behalf of a given container during runtime of the given container. The given container corresponds to one of a plurality of containers managed by the container manager application. The exception indicates that the request for use of memory requests an invalid operation on a memory table or that the request for use of memory requests a previously not seen memory table. Determining the action to perform depends on both first trustworthiness information associated with the given container and second trustworthiness information associated with the given container. The first trustworthiness information is obtained from a Third Party Reputation Service (TPRS). The second trustworthiness information is obtained based on monitoring the runtime behavior of the given container.

Technical advantages of certain embodiments of this disclosure may include one or more of the following. Certain embodiments provide protection against vulnerabilities associated with using containers to create virtual environments for applications. Examples of such vulnerabilities include kernel exploits, container breakouts, and poisoned images. Kernel exploits raise a concern, for example, when the kernel is shared among all containers and the host because sharing the kernel magnifies the potential impact of any vulnerability in the kernel. Should a container cause a kernel panic, it would take down the whole host, not only the container itself. Container breakouts raise a concern because an attacker who gains access to the container would then be able to gain access to other containers or the host. A process that breaks out of the container would have the same privileges on the host as it did in the container. A process with root privileges in the container would have root privileges in the host if it breaks out of the container, which increases the security risk. A poisoned image refers to an unsafe image (e.g., an image that comes from somewhere other than where it claims to come from). If an attacker can trick a user into running a poisoned image, both the host and the user's data are at risk. Certain embodiments protect against these risks by assessing the trustworthiness of a container image to ensure that it may be used safely. Certain embodiments increase security by monitoring the behavior of the container at runtime. Certain embodiments increase security be monitoring the container in an agentless manner from the perspective of the container such that a monitoring agent need not be deployed within the container.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Containers provide an efficient approach to creating virtual environments by sharing the same operating system among the containers. However, sharing the operating system introduces greater security vulnerabilities, such as vulnerabilities to kernel exploits and container breakouts. Additionally, container solutions, such as Docker, provide public libraries of application and operating system images from easy-to-distribute repositories. These public repositories introduce greater opportunity to contaminate systems with poisoned images. Some approaches have been introduced to better protect containers from vulnerabilities. Examples include container image signing and third-party container trust services. None of these approaches provide real-time container security management. Moreover, using container image signing does not work well in an enterprise market because there is no way to detect if the container image signature has been compromised.

Some approaches have been introduced to better protect virtual environments in general. Examples include using a hypervisor to monitor guests. These general approaches do not address the added complexity associated with providing protection in systems that include containers. Containers exist one layer deeper in the system than programs, and containers operate differently than programs, which adds complexities when dealing with containers. Certain embodiments provide solutions to these and other problems. For example, certain embodiments provide runtime protection that supports containers. As an example, a runtime container protection (RCP) system may comprise RCP logic, such as the RCP logic 125 described below with respect to FIG. 1. In general, the RCP logic is configured to provide RCP functionality in a virtualized environment. In certain embodiments, the RCP functionality comprises four phases:

Phase 1: before a container runs, the RCP logic harvests container image binaries and creates a memory page table database that forms a "fingerprint" of the container. The fingerprint represents a known-good memory table that Phase 3 uses to monitor running processes. The container image binaries are harvested in a manner that takes account of complexities associated with containers.

Phase 2: the RCP logic connects to a Third Party Reputation Service (TPRS) to determine the provenance and trustworthiness of the running container. Examples of TPRSs may include Twistlock, AquaSec, or other commercial container trust services.

Phase 3: the RCP logic monitors processes running in the container to detect new, previously not seen memory tables or invalid operations on the memory tables. Examples of previously not seen memory tables include memory tables that are not included in the fingerprint obtained in Phase 1 (i.e., the fingerprint that represents known-good memory tables). Examples of invalid operations include attempts to write to execute-only and/or read-only tables or attempts to execute non-executable tables. Performing the verification at runtime, as opposed to load time or distribution time, can increase security. For instance, the RCP logic can detect an active exploit even if the exploit exists only in memory (even if the exploit does not exist on disk). The RCP logic generates an exception if the container violates a page table use policy.

Phase 4: in response to detecting an exception in Phase 3, the RCP logic determines an action to take based on one or more policies (such as one or more policies configured by an administrator). A policy may include rules for determining the action to take based on a given exception detected in Phase 3 and a relationship between the exception and the trustworthiness of the running container. The trustworthiness is based on both (1) the TPRS trustworthiness (e.g., evaluation obtained from a commercial container trust service in Phase 2), and (2) the RCP logic's own evaluation of trustworthiness (e.g., based on behavior observed at runtime). Examples of actions to take include allowing the container to run or terminating the container process, depending on trustworthiness.

FIG. 1 illustrates an example of a system 100, in accordance with certain embodiments. In certain embodiments, system 100 comprises a computer 105, a private container hub 150, a network 160, a TPRS 170, and a public container hub 180. In general, computer 105 provides containers to create a virtual environment for applications. Additionally, computer 105 comprises RCP logic 125 configured to provide runtime container protection. RCP logic 125 interacts with private container hub 150 and/or TPRS 170 (via network 160) to assess trustworthiness of a container. Trustworthiness information obtained from TPRS 170 may be based at least in part on information that TPRS 170 obtains from public container hub 180.

Computer 105 may comprise any of a data center (or portion thereof), a server, a personal computer, a laptop computer, a workstation, or other computer system, such as the computer system 400 described with respect to FIG. 4 below. In the example shown in FIG. 1, computer 105 comprises hardware 110, Virtual Machine Manager (VMM) logic 120 (including RCP logic 125), Operating System (OS) 130, and container manager application 140 configured to manage one or more containers 142a-n. In general, computer 105 supports running user space applications in a virtualized environment. Examples of user space applications include databases, customer relationship management systems, e-mail servers, document or word processing servers, spreadsheets, software development environments, or others.

Hardware 110 comprises physical hardware resources that may be allocated to support one or more containers 142. A container 142 need not have any direct correspondence to specific physical hardware. Rather, hardware 110 may be configured to allow a container 142 to use hardware 110 as a guest. In this manner, hardware 110 may be shared among multiple containers 142. For example, containers 142 may virtually slice the host's OS 130 into segments that appear as dedicated machines to each container 142. Thus, containers 142 may be isolated from each other but exist on the same physical machine. Examples of hardware 110 may include processing circuitry (e.g., central processing units, cores, etc.), memory, storage devices such as disk drives, input/output devices, display elements, and other hardware.

VMM logic 120 may comprise logic configured to control read, write, and execution permissions of pages of memory that are used in computer 105. As an example, VMM logic 120 may intercept exceptions, such as attempts to write to execute-only and/or read-only tables, attempts to execute non-executable tables, or other page fault. In certain embodiments, VMM logic 120 is located right below the kernel (e.g., a computer program at the core of a computer 105's OS 130 that has complete control over everything in the system). VMM 120 shares resources with virtual environments (guests) controlled by VMM logic 120. VMM logic 120 grants a guest access to certain hardware 110, and that hardware 110 may be dedicated to the guest while the guest is running. A guests can run containers 142 on a one-to-many basis, and VMM logic 120 monitors hardware requests, input/output, and application behaviors from the containers 142. In certain embodiments, VMM logic 120 may have access to hardware 110, but hardware access is not required. Examples of VMM logic 120 may comprise a hypervisor (e.g., Kernel-based Virtual Machine (KVM), Xen, Microsoft Hyper-V, VMware vSphere, etc.) or other virtual machine monitor.

VMM logic 120 comprises RCP logic 125. RCP logic 125 comprises one or more computer programs, application programming interfaces, or other software elements that are configured to implement one or more of the techniques herein, generally involving applying runtime container protection. In certain embodiments RCP logic 125 comprises an agent (e.g., hypervisor agent), a shim (e.g., hypervisor shim), and/or other suitable components. The agent may run within VMM 120 and may provide communication outside of VMM 120, for example, to communicate with the shim or to obtain trustworthiness information from TPRS 170 (e.g., via network 160 and optionally via private container hub 150). The shim may interface with container manager application 140 in order to monitor and manage containers 142. For example, the shim may monitor processes running in a container 142 to detect new, previously not seen memory tables or invalid operations on the memory tables and may generate exceptions in response.

Certain embodiments integrate RCP logic 125 within the VMM logic 120. In other embodiments, VMM logic 120 may comprise a conventional VMM (e.g., a hypervisor) and separate RCP logic 125 may be supplied to extend the configuration or capabilities of the VMM to implement the techniques herein. Certain embodiments may provide an integrated approach to security by including both security features of the conventional VMM and security features of RCP logic 125. Certain embodiments of RCP logic 125 operate in conjunction with the memory page permissions bits of a VMM, rather than with memory page table bits of an operating system.

OS 130 may comprise system software that manages software and hardware 110 of computer 105 and provides common services for computer applications. Examples of OS 130 may include a LINUX, UNIX, Apple OS-X, or Microsoft Windows operating system, a variant of any of the preceding operating systems, or others.

Container manager application 140 may create and manage containers 142. A container 142 may be created based on an image (a replica of a specific operating environment) in order to provide a controlled environment to run one or more processes. A container 142 may provide a streamlined environment to run the processes by loading minimal resources, such as only the libraries and dependencies that are required by the processes. These processes may provide functionality of the user space applications supported by computer 105. Examples of container manager applications 140 include Mirantis Kubernetes Engine (formerly Docker), Amazon Elastic Container Service (ECS), Kubernetes Engine, AWS Fargate, JHipster, IBM Cloud Kubernetes Service, Rancher, Azure Kubernetes Service (AKS), Portainer, Kubernetes, and others.

Private container hub 150 may provide storage to support RCP logic 125 and/or may otherwise facilitate functionality of RCP logic 125. In certain embodiments, private container hub 150 may store any of the following: container images associated with private containers, fingerprints harvested for containers 142, trustworthiness information obtained for containers 142 (such as trustworthiness information previously obtained from TPRS 170 and/or trustworthiness information obtained by RCP logic 125's own monitoring of container 142 during runtime), memory page permissions bits or flags that RCP logic 125 may use to detect exceptions, policies to be applied by RCP logic 125, and/or other suitable information. Private container hub 150 may be integrated with VMM logic 120 or private container hub 150 may be independent. In certain embodiments, computer 105 and private container hub 150 may be included in a data center. In certain embodiments, private container hub 150 communicates with TPRS 170 via network 160 in order to obtain third party trustworthiness information associated with containers 142.

Network 160 generally facilitates communication between components of system 100. Network 160 may comprise any suitable type of network, such as an ad hoc network, a personal area network (PAN), a local area network (LAN), a wide area network (WAN), a metropolitan area network (MAN), one or more portions of the Internet, other type of network, or a combination of two or more of these. One or more portions of one or more of these networks may be wired or wireless.

TPRS 170 refers to a third party reputation service that provides information about the reputation/trustworthiness of a container 142. As an example, TPRS 170 can be a commercial container trust service, such as Twistlock, AquaSec, or others. In certain embodiments, TPRS 170 may identify vulnerabilities and compliance issues for container images stored in public container hub 180. For example, TPRS 170 may obtain a container image's Common Vulnerabilities and Exposure (CVE) data from a plurality of upstream sources, then parse, correlate, and consolidate the CVE data. By comparing data from multiple sources, TPRS 170 is able to generate trustworthiness information that has been analyzed, for example, to identify false positives and to identify recurring risks. TPRS 170 provides the trustworthiness in any suitable format, such as a numerical score or a categorization (red/yellow/green trustworthiness, high/medium/low risk, etc.).

Figure 2:
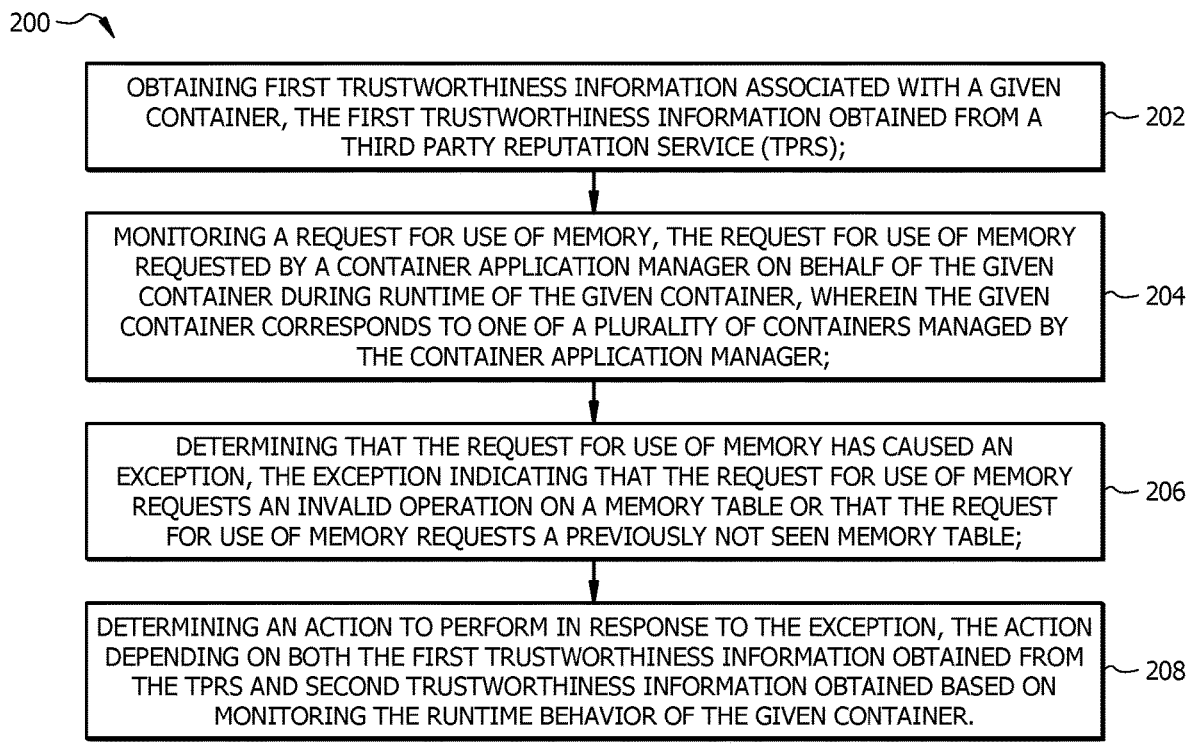
FIG. 2 illustrates an example of a method for runtime container protection, in accordance with certain embodiments.

FIG. 2 illustrates an example of a method 200 for runtime container protection, in accordance with certain embodiments. In certain embodiments, method 200 may be performed by WM logic 120 comprising RCP logic 125, described with respect to FIG. 1. In certain embodiments, method 200 begins at step 202 with obtaining first trustworthiness information associated with a given container 142 (such as container 142a). The first trustworthiness information is obtained from the TPRS 170. As an example, RCP logic 125 may obtain first trustworthiness information from TPRS 170 in response to an event that occurs prior to runtime. Examples of such events include deploying given container 142a, storing container 142a in computer 105 (or in private container hub 150), or otherwise preparing given container 142a to be run in the future by computer 105.

To obtain first trustworthiness information associated with given container 142a, RCP logic 125 sends TPRS 170 a request that includes information sufficient to uniquely identify given container 142a. As an example, RCP logic 125 sends TPRS 170 a hash of given container 142 (e.g., a hash of the entire container). Other examples of unique identifiers may include a fingerprint, image, or container ID associated with given container 142. By uniquely identifying given container 142*a*, RCP logic 125 ensures that the first trustworthiness information obtained from TPRS 170 corresponds to the correct container 142 (i.e., to make sure that RPC logic 125 and TPRS 170 are talking about the same container 142). TPRS 170 can do a scan, for example, to determine if given container 142*a* was signed by a trustworthy source. TPRS 170 provides the first trustworthiness information to RCP logic 125. The first trustworthiness information can have any suitable format, such as a numerical score or a categorization (red/yellow/green trustworthiness, high/medium/low risk, etc.). RCP logic 125 and TPRS 170 may exchange information via any suitable components. For example, in certain embodiments, RCP logic 125 obtains the first trustworthiness information from TPRS 170 via private container hub 150 and/or network 160.

Method 200 proceeds to step 204 to perform runtime monitoring of the given container 142*a*. For example, runtime monitoring can occur once the given container 142*a* has been pulled down, installed, and started to run on computer 105. At step 204, method 200 monitors a request for use of memory. The request for use of memory is requested by a container manager application 140 on behalf of given container 142*a* during runtime of given container 142*a*. Given container 142*a* corresponds to one of a plurality of containers that are managed by container manager application 140 (e.g., container manager application 140 manages containers 142*a-n*).

In certain embodiments, the monitoring of the request for use of memory in step 204 occurs outside of given container 142*a* such that the monitoring is agentless from the perspective of given container 142*a*. For example, the monitoring of step 204 may occur at a level that is below the level of OS 130 upon which container manager application 140 runs. FIG. 1 illustrates an example in which VMM logic 120/RCP logic 125 (which are below OS 130) perform the runtime monitoring of given container 142*a*. For context, a bad actor trying to run malware would typically look for indicators that the malware is being monitored by known anti-malware tools/agents running within given container 142*a*, container manager application 140, or OS 130. If the malware figures out that it is being monitored, it may make adjustments to try to evade the anti-malware agent. By contrast, RCP logic 125 runs "agentless" malware detection from the perspective of given container 142*a* (there is no agent running at the level of container 142*a*, container manager application 140, or OS 130). The malware does not know that it is being monitored because the malware does not have visibility into the level of VMM logic 120/RCP logic 125, which prevents the malware from taking steps to evade detection.

To be able to run agentless detection, RCP logic 125 needs to be able to map suspicious behavior to the given container 142*a*. As further discussed below with respect to FIG. 3, RCP logic 125 is multiple layers removed from the given container 142*a*. As a result, RCP logic 125 does not have direct knowledge of which one of the plurality of containers 142*a-n* managed by container manager application 140 is running a certain behavior. For example, the request for use of memory being monitored in step 204 does not include any container-specific information identifying given container 142*a*. Because the request comes from container manager application 140, the request could potentially correspond to any of containers 142*a-n* represented by container manager application 140 (i.e., the request does not state the particular container 142 on behalf of which it was sent). In certain embodiments, RCP logic 125 determines that container manager application 140 sent the request for use of memory on behalf of given container 142*a* based on a mapping. For example, in certain embodiments, RCP logic 125 is programmed with knowledge about how container manager application 140 assigns process identifiers (process IDs) to containers 142. Then, when RCP logic 125 sees a particular process ID running on OS 130, RCP logic 125 can associate the process ID to a particular container (e.g., given container 142*a*). Further examples of the mapping are discussed below with respect to FIG. 3.

At step 206, method 200 determines that the request for use of memory monitored in step 204 has caused an exception. As an example, certain exceptions indicate that the request for use of memory requests an invalid operation on a memory table. Invalid operations include an attempt to write to execute-only and/or read-only tables, an attempt to execute a non-executable table, etc. As another example, certain exceptions indicate that the request for use of memory requests a previously not seen memory table. For, example, as described above, before given container 142*a* runs, RCP logic 125 can harvest container image binaries and create a "fingerprint" of known-good memory tables associated with given container 142*a*. Then, during runtime, RCP logic 125 can use the fingerprint to detect a request for a previously not seen memory table that does not match the fingerprint (Phase 3). In addition, or in the alternative, RCP logic 125 can keep track of the hashes of memory pages as they are seen and use the hashes to quickly compare a request for a memory page to see if that memory page has been seen before. Certain embodiments add a hash to a list when the hash is first seen; other embodiments may wait to add the hash to the list until confirming that the associated container 142 satisfies one or more trustworthiness criteria.

In response to determining that the request for use of memory has caused an exception, method 200 proceeds to step 208 with determining an action to perform. By acting upon an exception detected during runtime, security risks can be handled in real-time. For example, method 200 may prevent given container 142*a* from running untrustworthy processes that might otherwise cause computer 105 to experience problems, such as a crash.

In certain embodiments, the action determined in step 208 depends on both the first trustworthiness information obtained in step 202 (i.e., the first trustworthiness information obtained from TPRS 170) and second trustworthiness information associated with given container 142*a*. The second trustworthiness information is obtained based on monitoring the runtime behavior of the given container (e.g., RCP logic 125's own assessment of trustworthiness). In certain embodiments, RCP logic 125 determines the second trustworthiness information based on the exception caused by the given container 142*a* and any previous exceptions caused by the given container 142*a*. As an example, RCP logic 125 may consider an invalid operation exception more trustworthy (or less trustworthy) than an exception based on requesting a previously not seen memory table. As another example, RCP logic 125 may consider multiple exceptions caused by the same container 142 to be more untrustworthy than a single exception. The second trustworthiness information can have any suitable format, such as a numerical score or a categorization (red/yellow/green trustworthiness, high/medium/low risk, etc.). In some embodiments, the second trustworthiness information simply provides information about the exception (occurrence of the exception, type of exception, and/or number of previous exceptions associated with given container 142*a*) as an input when applying a policy.

Determining an action to perform based on both the first trustworthiness information (obtained from TPRS 170 prior to runtime) and the second trustworthiness information (obtained from RCP logic 125's own assessment of runtime behavior) allows container 142 to be assessed both prior to runtime and during runtime. If the first trustworthiness information from TPRS 170 indicates that given container 142*a* is very untrustworthy, RCP logic 125 may prevent given container 142*a* from being run at all. Otherwise, if the first trustworthiness information from TPRS 170 indicates that given container 142*a* is at least somewhat trustworthy, RCP logic 125 may allow given container 142*a* to be pulled down, installed, and start running, subject to further monitoring by RCP logic 125 during runtime. As described above, runtime monitoring can include monitoring every memory page requested by given container 142*a*, detecting any exceptions, and determining an action to take when an exception has been detected. The action depends on both the first and second trustworthiness information.

In certain embodiments, determining the action to perform in step 208 is based on a policy. The policy indicates how much leeway to grant the given container 142*a* based at least in part on the first trustworthiness information. As examples:

- If the first trustworthiness information indicates that given container 142*a* has low trustworthiness (e.g., reputation score of 0, 1, or 2), in response to detecting any exception, the policy may indicate to stop given container 142*a* from running any processes.
- If the first trustworthiness information indicates that given container 142*a* has medium trustworthiness (e.g., reputation score of 3, 4, 5, 6, or 7), the policy may indicate to allow given container 142*a* to continue running processes unless/until given container 142*a* triggers a number (N) more exceptions. The number (N) may be decremented each time an exception occurs, and given container 142*a* may be deemed too suspicious and may be stopped once (N) reaches zero.
- If the first trustworthiness information indicates that given container 142*a* has high trustworthiness (e.g., reputation score of 8, 9, or 10), the policy may indicate to allow given container 142*a* to continue running processes even if it triggers more exceptions.

In this manner, the policy may allow a container 142 with a good reputation to perform a higher number of unexpected actions because it is more trusted. However, the policy may shut down a container 142 with a bad reputation right away, before it can perform any unexpected actions.

As described above, in certain embodiments, trustworthiness information may be provided in the form of a numerical score. As an example, a container 142 could be scored from 0 to 10, with a score of 0 being least trustworthy and a score of 10 being most trustworthy. Other embodiments may arrange the scores in reverse order (e.g., 10 could be least trustworthy and 0 could be most trustworthy). Other embodiments may use a different minimum value and/or maximum value for the score. In certain embodiments, the first trustworthiness information comprises a first score, the second trustworthiness information comprises a second score. The first score and second score may be used together in any suitable way.

Certain embodiments determine the action to perform in step 208 by adding the first score and the second score to yield a composite score, comparing the composite score to a threshold, and stopping one or more processes associated with given container 142*a* in response to determining that the composite score fails to satisfy a trustworthiness threshold (or allowing the one or more processes associated with given container 142*a* to proceed in response to determining that the composite score satisfies the trustworthiness threshold). Optionally, in some embodiments, adding the first score and the second score can include applying one or more weighting factors (e.g., the first score could be weighted at 50% and the second score could be weighted at 100%).

As an example, suppose that the trustworthiness threshold indicates to stop any processes for which the composite score is less than 10. If the first score was 4 and the second score was 3, the composite score would be 7 and the process(es) associated with given container 142*a* would be stopped for failing to satisfy the threshold. On the other hand, if the first score was 7 and the second score was 8, the composite score would be 15. Thus, the composite score would satisfy the trustworthiness threshold such that the process(es) associated with given container 142*a* would be allowed to proceed. Suppose given container 142*a* generates more exceptions as it continues to run. RCP logic 125 could downgrade the second score to 1, in which case the composite score would drop to 9 and the trustworthiness threshold would no longer be satisfied. The process(es) associated with given container 142*a* would then be stopped. Note that in other embodiments in which lower scores are considered better/more trustworthy than higher scores, the logic could be reversed (e.g., composite scores below a trustworthiness threshold would satisfy the threshold, and composite scores above the trustworthiness threshold would fail to satisfy the threshold).

Certain embodiments use one of the first score and the second score to determine a trustworthiness threshold that applies to the other of the first score and the second score. In response to determining that the trustworthiness threshold has not been satisfied, certain embodiments stop one or more processes associated with the given container 142*a*. As an example, the first score may be used to determine the trustworthiness threshold to apply to the second score: the trustworthiness threshold could be set to require the second score to be at least 6 when the first score is 5, for the second score to be at least 4 when the first score is 6, and the second score to be at least 2 when the first score is 7. If the second score fails to satisfy the applicable threshold, the processes associated with given container 125 would be stopped. As another example, the second score may be used to determine the trustworthiness threshold to apply to the first score: the trustworthiness threshold could be set to require the first score to be at least 6 when the second score is 5, for the first score to be at least 5 when the second score is 6, and the first score to be at least 4 when the second score is 7. If the first score fails to satisfy the applicable threshold, the processes associated with given container 125 would be stopped.

As another example, if the first score is 6 (medium trust level) and the second trust score is 2 (meaning do not outright deny given container 142*a*), then given container 142*a* may be permitted to run. However, the policy may tell RCP logic 125 to kill a process of given container 142*a* in response to detecting an exception (e.g., when given container 142*a* loads memory pages that are not in the pre-ingested signature database, meaning that the container does not match its signature file and may have been compromised). RCP logic 125 may update its page table database with the new page signatures. In this manner, RCP logic 125 can adapt to the runtime environment. For example, if the same "unknown" page repeatedly shows up, the page table would be updated to add the page. Certain embodiments may include one or more safeguards before adding the page, such confirming that the user indicates the behavior to be proper (or confirming that the user has not indicated the behavior to be improper). One instance where this can occur is when patching a specific user space application without generating a new VM image binary. An example would be installing a patch to something like "openssl" that lives within the container. The "openssl" can now generate a memory page that is not in the signature list but is not a threat to the container or environment.

As another example, if the first score is 6 (medium trust level) and the second trust score is 0 (meaning deny given container 142a), the policy tells RCP logic 125 to kill the offending container process.

As another example, if the first score is 10 (most trusted) and the second score is 8 (e.g., which may indicate that RCP logic 125 has detected an unfamiliar memory table), the policy may tell RCP logic 125 to let processes continue and to load new page tables even though new memory pages are not found in the signature database. Alternatively, if the first score had been 6 (less trustworthy than a score of 10) and the second sore had been 8, the policy may have indicated to block the processes.

As noted above, the scores are provided only as examples. Other scoring systems are possible (e.g., a low number could be a good score and a high number could be a bad score, the range of available scores could differ, and/or the trustworthiness threshold values could be set differently).

For simplicity, FIG. 2 has been described as monitoring a given container 142a. The method 200 of FIG. 2 may be performed for each request for use of memory requested by container manager application 140, including with respect to requests made on behalf of other containers 142b-n. Thus, whenever container manager application 140 spins off a container 142 (e.g., pulls a container image from a repository and attempts to execute the container image locally), RCP logic 125 may perform runtime container protection for that container 142.

As discussed above, FIG. 2 includes embodiments in which RCP logic 125 determines that an exception has occurred and, in response, determines an action to perform based on both first trustworthiness information (obtained from TPRS 170) and second trustworthiness information (obtained from RCP logic 125's own assessment of trustworthiness based on monitoring runtime behavior of container 142). Other embodiments may determine the action to perform based on first trustworthiness information (without necessarily requiring the second trustworthiness information) or based on the second trustworthiness information (without necessarily requiring the first trustworthiness information).

Figure 3:
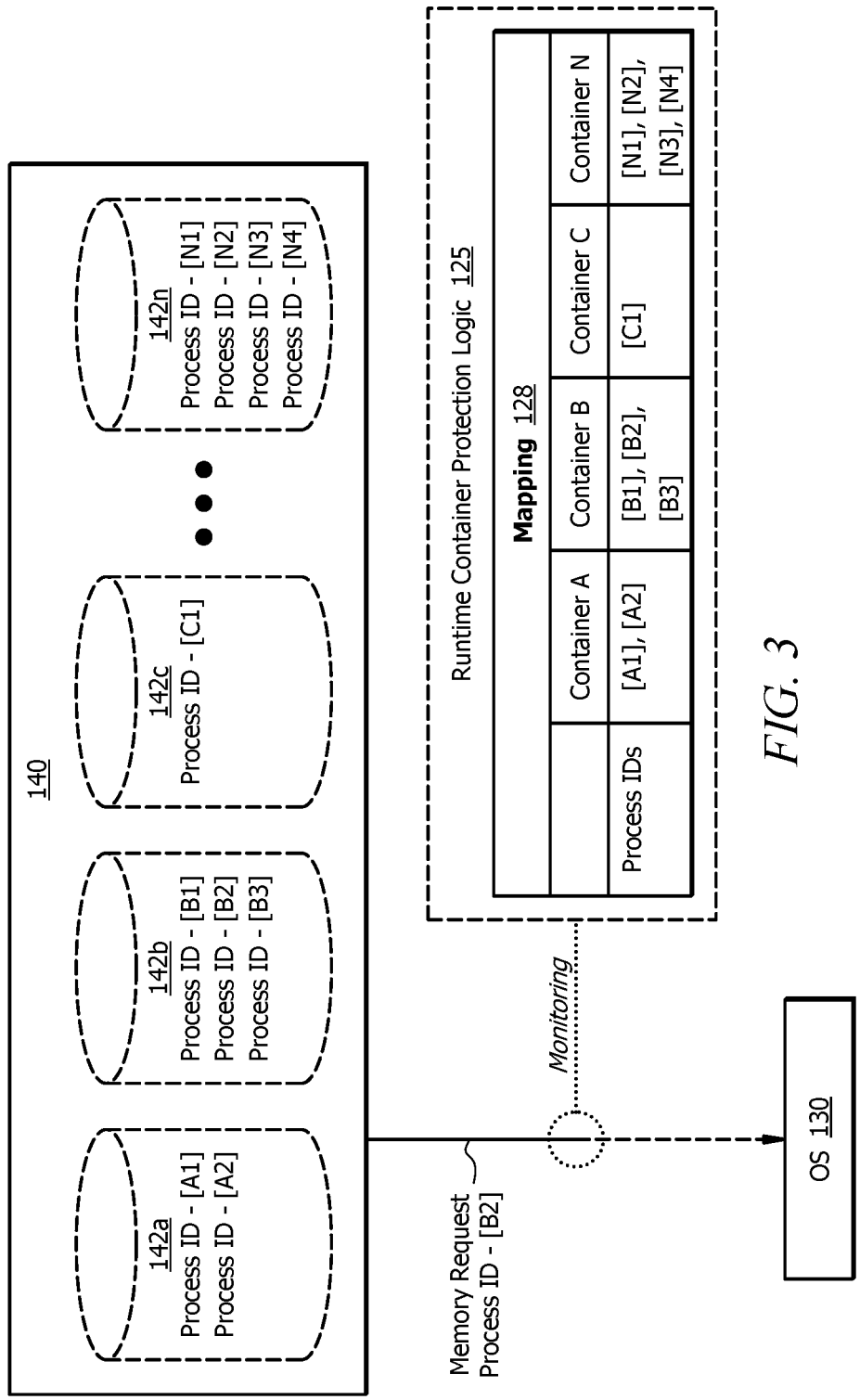
FIG. 3 illustrates an example of mapping memory requests to a container, in accordance with certain embodiments.

Turning now to FIG. 3. For context, providing security in a computer that uses containers adds complexity compared to providing security in a computer that does not use containers, as further described below. For purposes of explanation, a computer that uses containers may be referred to as "container-based" computer and a computer that does not use containers may be referred to as a "non-container" computer.

As an example, a non-container computer may comprise hardware, VMM logic, and an OS generally analogous to hardware 110, VMM logic 120, and OS 130 of computer 105 shown in FIG. 1. The non-container computer would not include container-specific features, such as RCP logic 125, container manager application 140, and containers 142. In a non-container computer, one or more user space applications would execute above the OS (in lieu of the container manager application 140). Thus, a user space application itself would make requests to use memory. A shim could be placed in the VMM logic between the VMM and the OS. Thus, when the user space application requests to use memory, the VMM could check if the requested page table was one that had not been seen before. If the requested page table was one that had not been seen before, the VMM could stop the user space application.

A container-based computer adds complexity because it is the container manager application 140, rather than the user space application or the container 142, that makes requests to use memory. As a result, VMM logic 120 does not have visibility into memory requested by a particular container 142. All that VMM logic 120 sees is that container manager application 140 has requested to use memory, but container manager application 140 could be representing any of multiple containers (e.g., 2, 3, 4, 5, or more containers). Container manager application 140 does not specify the particular container 140 on behalf of which memory is being requested. In other words, container manager 140 adds a layer between VMM logic 120 and container 142, without passing container-specific information to VMM logic 120 (like user name, network name space, container ID, or other container-specific information for identifying a particular container 142).

Certain embodiments of the present disclosure provide solutions to this problem. For example, certain embodiments comprise RCP logic 125 configured to monitor requests from container manager application 140 and map each request to a corresponding container 142. As an example, in certain embodiments, RCP logic 125 uses knowledge about how container manager application 140 allocates process IDs to containers 142 in order to determining a mapping between process IDs and containers 142. When container manager application 140 requests memory for a particular process ID, RCP logic 125 may determine the container 142 that maps to the process ID in order to perform monitoring at the container level.

FIG. 3 illustrates an example in which RCP logic 125 determines a mapping 128 and uses mapping 128 to associate a request for memory with a particular container 142 making the request. In the example of FIG. 3, container manager application 140 manages a plurality of containers 142a-142n. Each container has an associated container identifier (container ID). In the example of FIG. 3, containers 142a, 142b, 142c, and 142n have container IDs A, B, C, and N, respectively. The container IDs may be any suitable identifiers that enable RCP logic 125 to associate a request for use of memory with the container 142 on behalf of which the request has been made. For purposes of mapping 128, it is possible for the container IDs to be assigned by RCP logic 125, without necessarily having to match container IDs that may be used internally within container manager application 140 or containers 142. For example, container 142a could be identified as container ID A for purposes of mapping 128 and could be identified by some other naming convention (such as container ID 000) internally within container manager application 140 or containers 142.

Each container 142 is configured to run one or more processes, and each process has an associated process ID. For purposes of explanation, FIG. 3 illustrates container 142a as configured to run process IDs [A1], [A2], ... [An]; container 142b as configured to run process IDs [B1], [B2], ... [Bn]; container 142c as configured to run process IDs [C1], [C2], [Cn]; and so on through container 142n configured to run process IDs [N1], [N2], ... [Nn]. RCP logic 125 determines mapping 128 based on knowledge of how container manager application 140 allocates process IDs to containers. As an example, RCP logic 125 may have knowledge that container manager application 140 allocates the first process ID [A1] of the first container 142a as process ID 0. Thus, RCP logic 125 may map process ID 0 to container ID A. RCP logic 125 can support different mapping strategies depending on which container manager application 140 is being used. For example, a container manager application 140 provided by one company may use different offsets than a container manager application 140 provided by a different company. RCP logic 125 may determine the mapping based on which container manager application 140 is being used.

When container manager application 140 sends requests for memory, RCP logic 125 monitors the requests. In certain embodiments, a request for memory indicates a process ID associated with the request, but does not indicate a container ID associated with the request. RCP logic 125 determines the container ID that maps to the process ID of the request based on knowledge of how container manager application 140 assigns process IDs. RCP logic 125 determines whether the request associated with the particular container ID triggers an exception. If the request does not trigger an exception, RCP logic 125 may permit the process to proceed. If the request triggers an exception, RCP logic 125 may determine an action to take, such as terminating the process or permitting the process to proceed, depending on the result of applying a policy. As described above, the policy may determine the action based on both TPRS trustworthiness and RCP logic 125's own evaluation of trustworthiness associated with the container 142. If the process ID maps to a container 142 with high trustworthiness, the process may be given more leeway compared to if the process ID had mapped to a container 142 with low trustworthiness.

Figure 4:
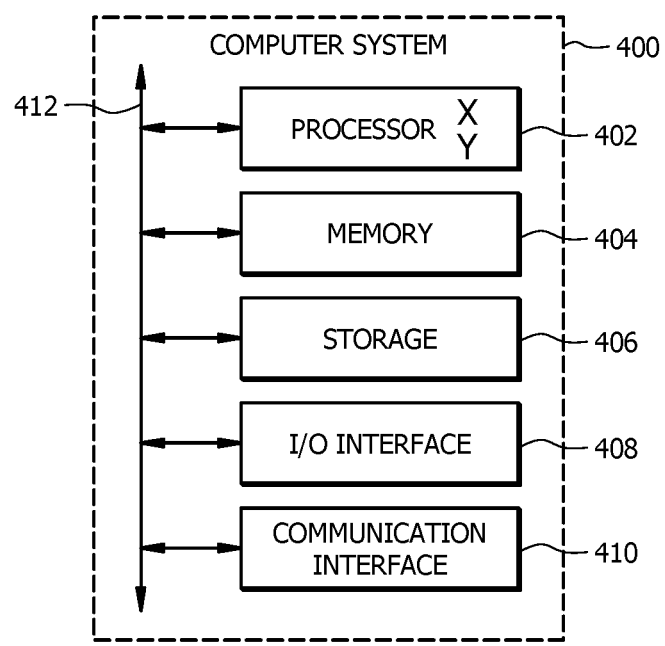
FIG. 4 illustrates an example of a computer system, in accordance with certain embodiments.

FIG. 4 illustrates an example computer system 400. In certain embodiments, any of computer 105, private container hub 150, network 160, TPRS 170, public container hub 180, or components of any of the preceding, may be implemented using a computer system 400 or one or more components of computer system 400. In particular embodiments, one or more computer systems 400 perform one or more steps of one or more methods described or illustrated herein, such as one or more steps of the method described with respect to FIG. 3. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example, and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes processing circuitry (e.g., processor 402), memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example, and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In certain embodiments, processor 402 may include one or more modules to facilitate the functionality described herein. As an example, processor 402 may comprise a module X configured to obtain trustworthiness of a container 142 from TPRS 170 and/or a module Y configured to monitor container 142 at runtime (e.g., determine if container 142 causes an exception and, if so, determine an action to take based in part on the trustworthiness that module X obtained from TPRS 170).

In particular embodiments, memory 404 includes main memory for storing instructions for processor 402 to execute or data for processor 402 to operate on. As an example, and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example, and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example, and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example, and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductorbased or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

As discussed above, certain embodiments of the present disclosure involve monitoring a container application's use of memory to detect when the container attempts to load memory pages that have never been seen before, joining this measurement with trustworthiness information from a TPRS, and determining whether to let the container application proceed based on the joined information. This is done without running an agent inside of the container. Certain embodiments provide improved security compared to existing approaches. For example, certain existing approaches look only at file input/output, memory input/output, or performance characteristics, such as API calls. By contrast, embodiments of the present disclosure take the monitoring a level deeper and monitor what memory is being accessed. This check can be performed earlier in the process than the monitoring performed by existing approaches, and it does not require knowledge of predetermined behaviors.

Certain embodiments of the present disclosure allow for providing improved security compared to existing approaches that scan a software container's behavior at runtime against a list of known vulnerabilities (e.g., known malware signatures or known soft spots, such as particular system calls, access to particular files, or access to a specific network port, protocol, payload, network resource, etc. associated with a known vulnerability). As noted above, the present disclosure includes embodiments that do not require pre-existing knowledge of a vulnerability in order to protect against the vulnerability. For example, embodiments of the present disclosure detect new, previously not seen memory tables or invalid operations on the memory tables and may generate exceptions in response.

Certain embodiments of the present disclosure allow for monitoring a container without requiring a monitoring agent to be present within the container. This prevents malware from evading the monitoring and thus provides improved security compared to existing approaches that require a monitoring agent to be present within the container. Additionally, the monitoring described in the present disclosure can be performed in real-time and can stop a container from running if the container violates a policy, which increases security compared to existing approaches that merely collect diagnostic information after a container causes a crash or other problem.

Certain embodiments of the present disclosure improve security in a container environment compared to existing approaches developed for non-container environments. For example, some existing approaches merely use a VMM to run integrity checks that determine whether to allow or prevent execution of executable code. Such existing approaches fail to address the complexities introduced by the container environment (e.g., containers exist one layer deeper in the system than programs, and containers operate differently than programs, which adds complexities when dealing with containers).

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular directed to a method, a storage medium, a system and a computer program product, wherein any feature mentioned in one category, e.g. method, can be applicable in another category, e.g. system, as well. The various features disclosed herein may be combined or separated in any suitable manner.

The invention claimed is:

1. A system, the system comprising:
one or more processors; and
one or more computer-readable non-transitory storage media, the one or more computer-readable non-transitory storage media comprising instructions that, when executed by the one or more processors, cause one or more components of the system to perform operations comprising:
monitoring a request for use of memory, the request for use of memory requested by a container manager application on behalf of a given container during runtime of the given container, the given container corresponding to one of a plurality of containers managed by the container manager application;
determining that the request for use of memory has caused an exception, the exception indicating that the request for use of memory requests an invalid operation on a memory table or that the request for use of memory requests a previously not seen memory table; and in response to determining that the request for use of memory has caused the exception, determining an action to perform, the action depending on both first trustworthiness information associated with the given container and second trustworthiness information associated with the given container, the first trustworthiness information obtained from a Third Party Reputation Service (TPRS) and the second trustworthiness information obtained based on monitoring runtime behavior of the given container;

wherein the first trustworthiness information comprises a first score, the second trustworthiness information comprises a second score, and determining the action to perform comprises:

adding the first score and the second score to yield a composite score;

comparing the composite score to a trustworthiness threshold; and stopping one or more processes associated with the given container in response to determining that the composite score fails to satisfy the trustworthiness threshold.

2. The system of claim 1, wherein the operations further comprise:
obtaining the first trustworthiness information from the TPRS prior to the runtime of the given container.

3. The system of claim 1, wherein:
the request for use of memory requested by the container manager application does not include a container identifier identifying the given container; and
the operations further comprise determining that the request for use of memory was sent on behalf of the given container based on a mapping.

4. The system of claim 1, wherein the monitoring of the request for use of memory occurs outside of the given container such that the monitoring is agentless from the perspective of the given container.

5. The system of claim 1, wherein determining the action to perform is based on a policy that indicates how much leeway to grant the given container based at least in part on the first trustworthiness information.

6. The system of claim 1, wherein:
the operations further comprise obtaining a fingerprint associated with the given container, the fingerprint representing one or more known-good memory tables obtained by harvesting container image binaries associated with the given container; and
determining that the request for use of memory requests the previously not seen memory table based at least in part on a requested memory table failing to match the fingerprint associated with the given container.

7. A method, the method comprising:
monitoring a request for use of memory, the request for use of memory requested by a container manager application on behalf of a given container during runtime of the given container, the given container corresponding to one of a plurality of containers managed by the container manager application;
determining that the request for use of memory has caused an exception, the exception indicating that the request for use of memory requests an invalid operation on a memory table or that the request for use of memory requests a previously not seen memory table; and
in response to determining that the request for use of memory has caused the exception, determining an action to perform, the action depending on both first trustworthiness information associated with the given container and second trustworthiness information associated with the given container, the first trustworthiness information obtained from a Third Party Reputation Service (TPRS) and the second trustworthiness information obtained based on monitoring runtime behavior of the given container;

wherein the first trustworthiness information comprises a first score, the second trustworthiness information comprises a second score, and determining the action to perform comprises:

adding the first score and the second score to yield a composite score;

comparing the composite score to a trustworthiness threshold; and stopping one or more processes associated with the given container in response to determining that the composite score fails to satisfy the trustworthiness threshold.

8. The method of claim 7, further comprising:
obtaining the first trustworthiness information from the TPRS prior to the runtime of the given container.

9. The method of claim 7, wherein:
the request for use of memory requested by the container manager application does not include a container identifier identifying the given container; and
the method further comprises determining that the request for use of memory was sent on behalf of the given container based on a mapping.

10. The method of claim 7, wherein the monitoring of the request for use of memory occurs outside of the given container such that the monitoring is agentless from the perspective of the given container.

11. The method of claim 7, wherein determining the action to perform is based on a policy that indicates how much leeway to grant the given container based at least in part on the first trustworthiness information.

12. One or more computer-readable non-transitory storage media embodying instructions that, when executed by a processor, cause performance of operations including:
monitoring a request for use of memory, the request for use of memory requested by a container manager application on behalf of a given container during runtime of the given container, the given container corresponding to one of a plurality of containers managed by the container manager application;
determining that the request for use of memory has caused an exception, the exception indicating that the request for use of memory requests an invalid operation on a memory table or that the request for use of memory requests a previously not seen memory table; and
in response to determining that the request for use of memory has caused the exception, determining an action to perform, the action depending on both first trustworthiness information associated with the given container and second trustworthiness information associated with the given container, the first trustworthiness information obtained from a Third Party Reputation Service (TPRS) and the second trustworthiness information obtained based on monitoring runtime behavior of the given container;

wherein the first trustworthiness information comprises a first score, the second trustworthiness information comprises a second score, and determining the action to perform comprises:

adding the first score and the second score to yield a composite score;

comparing the composite score to a trustworthiness threshold; and stopping one or more processes associated with the given container in response to determining that the composite score fails to satisfy the trustworthiness threshold.

13. The one or more computer-readable non-transitory storage media of claim 12, wherein the operations further comprise:

obtaining the first trustworthiness information from the TPRS prior to the runtime of the given container.

14. The one or more computer-readable non-transitory storage media of claim 12, wherein:

the request for use of memory requested by the container manager application does not include a container identifier identifying the given container; and the operations further comprise determining that the request for use of memory was sent on behalf of the given container based on a mapping.

15. The one or more computer-readable non-transitory storage media of claim 12, wherein the monitoring of the request for use of memory occurs outside of the given container such that the monitoring is agentless from the perspective of the given container.

16. The one or more computer-readable non-transitory storage media of claim 12, wherein determining the action to perform is based on a policy that indicates how much leeway to grant the given container based at least in part on the first trustworthiness information.

* * * * *